Fig. 2.

Inventors
Thomas B. Clarke
George W. Gibson
By their Attorney

Dec. 20, 1955     T. B. CLARKE ET AL     2,727,260
HEEL SEAT FITTING MACHINES

Inventors
Thomas B. Clarke
George W. Gibson
By their Attorney

Dec. 20, 1955     T. B. CLARKE ET AL     2,727,260
HEEL SEAT FITTING MACHINES Filed March 5, 1952                           7 Sheets-Sheet 6

*Inventors.*
Thomas B. Clarke
George W. Gibson
By their Attorney

Dec. 20, 1955   T. B. CLARKE ET AL   2,727,260
HEEL SEAT FITTING MACHINES
Filed March 5, 1952   7 Sheets-Sheet 7

Inventors
Thomas B. Clarke
George W. Gibson
By their Attorney

United States Patent Office 2,727,260
Patented Dec. 20, 1955

2,727,260

HEEL SEAT FITTING MACHINES

Thomas Baggott Clarke and George William Gibson, Leicester, England, assignors to United Shoe Machinery Corporation, Flemington, N. J., a corporation of New Jersey Application March 5, 1952, Serial No. 274,944

Claims priority, application Great Britain March 20, 1951

17 Claims. (Cl. 12—31.5)

This invention relates to heel seat fitting machines for use in the manufacture of shoes and is illustrated as embodied in improvements in the Heel Seat Fitting Machine disclosed in United States Letters Patent No. 2,215,524, granted September 24, 1940, on an application filed in the name of George Hazelton.

The present invention consists in the novel features hereinafter described, reference being had to the accompanying drawings illustrating one embodiment of the invention selected for purposes of illustration, said invention being fully described in the following specification and claims.

Figures 4, 16A:
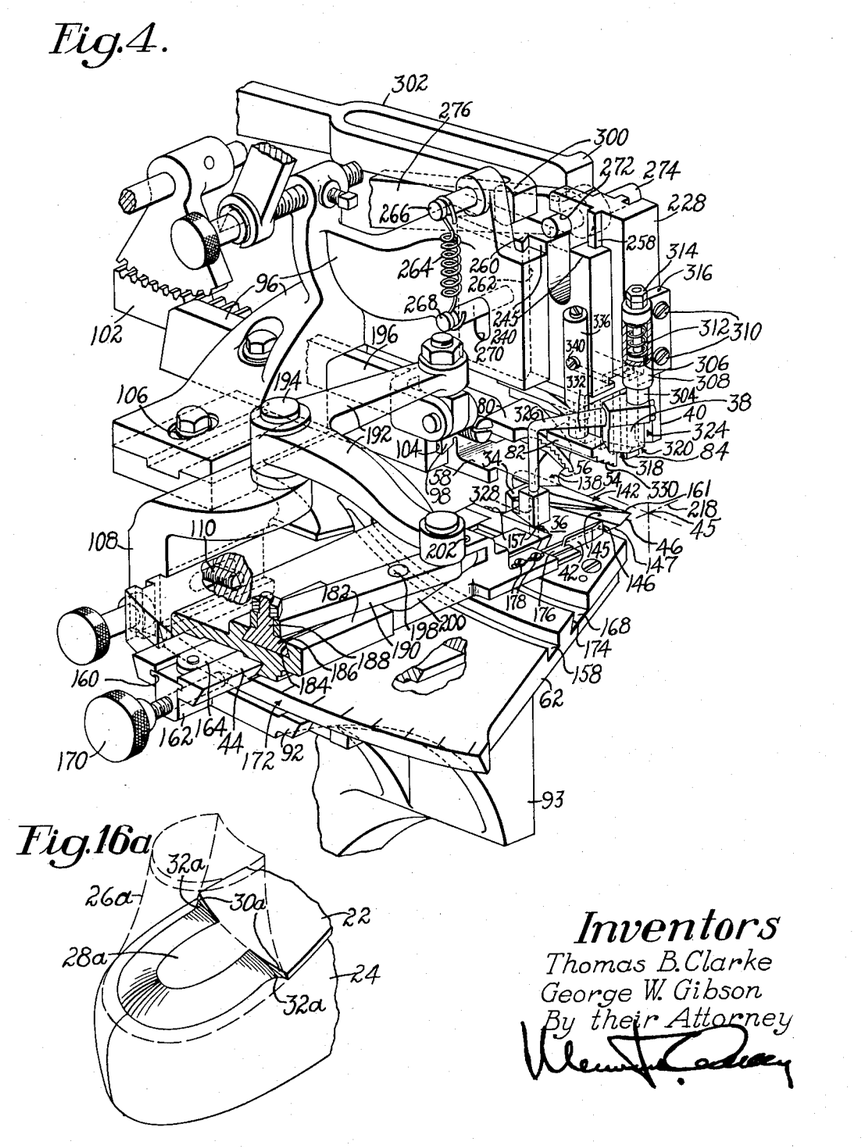
Fig. 4 is a perspective view of the left sector of the machine together with associated crease plates, clamps and bulgers carried by said sector.
Fig. 16a is a view similar to Fig. 16 but showing the attached sole of a shoe fitted for the reception of a Cuban heel which is shown in skeleton on the shoe.
Figures 11, 12, 13, 15, 16, 17:
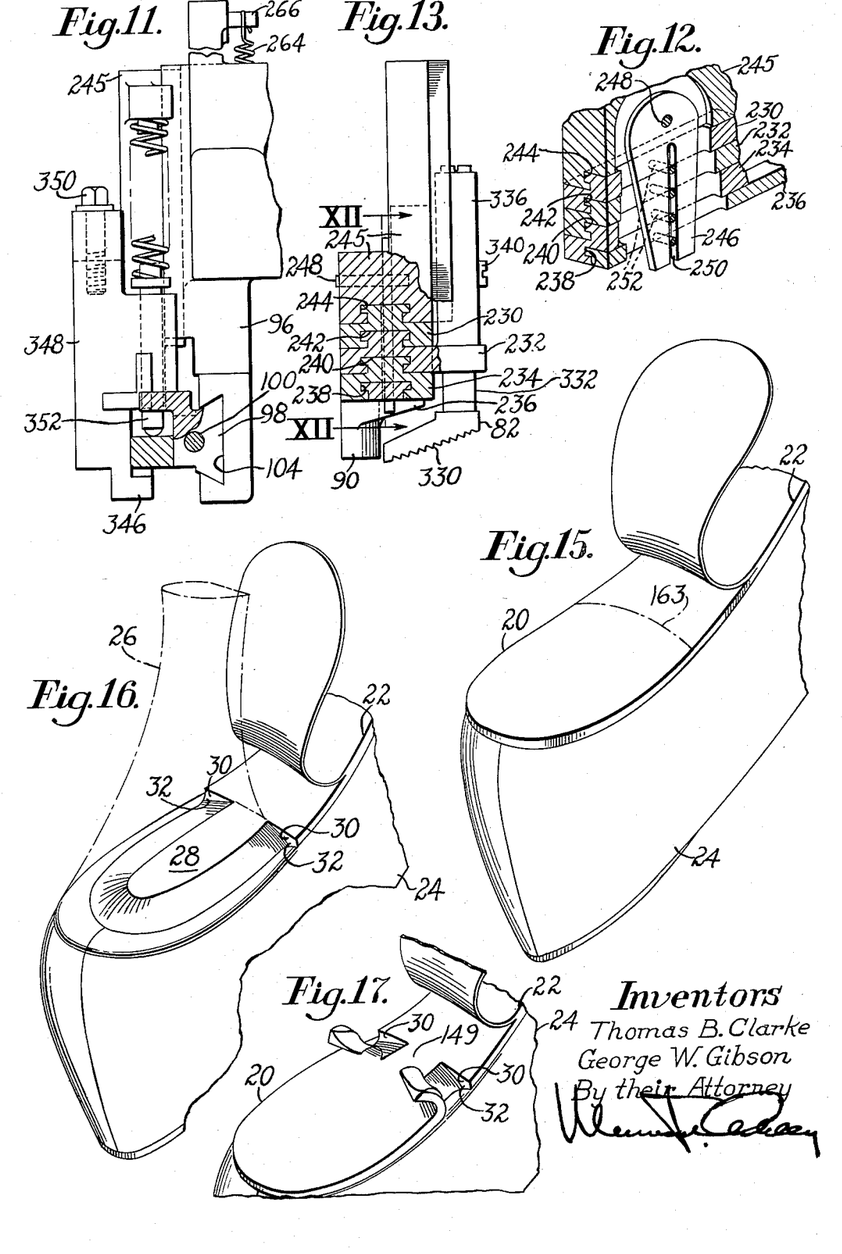
Fig. 11 shows, as viewed on line XI—XI of Fig. 3, a clamp controlling bracket which is secured to a left carrier slide and may be considered as part of said slide.
Fig. 12 is a sectional view on line XII—XII of Fig. 13 showing portions of the left carrier slide and nested bulger slides supported thereby.
Fig. 13 is a detail view, partly in section on line XIII—XIII of Fig. 3, showing the left carrier slide and the nested bulger slides.
Fig. 15 is a perspective view of the rear end portion of a shoe the attached sole of which is to be fitted by the use of the illustrative machine.
Fig. 16 shows in perspective the shoe the sole of which has been fitted for the reception of a Louis heel by the use of the illustrative machine and a Louis heel in skeleton positioned upon the fitted heel seat portion of the sole.
Fig. 17 is a perspective view of the heel seat portion of the shoe after it has been operated upon by the shoulder- and fillet-forming knives but before the operation of a back knife.

The invention is disclosed with reefrence to fitting, that is, preparing, the heel seat portions 20 (Figs. 8, 9, 15 and 17) of attached outsoles 22, hereinafter referred to as soles, of shoes 24 for the reception of Louis heels 26 (Fig. 16) or Cuban heels 26a (Fig. 16a), said heel seat portions being reduced by the use of the illustrative machine to form elongated or "full sized" heel seat tabs 28, 28a and heel breast receiving shoulders 30, 30a.

In order to form an effective seat for the heel it is desirable that the outer or seat face of the tab 28 or 28a shall be approximately complemental to an opposing portion of the attaching face of the heel 26 or 26a, the heel breast receiving shoulders 30, 30a being so shaped and arranged that when the heel is correctly positioned upon the shoe 24 the upper breast corners of the breast of the heel shall snugly engage said shoulders. In order to insure, especially in a shoe 24 the sole 22 of which is cement attached, against the rear lateral portions of the shank of said sole curling away from the shoe upper, it is highly desirable to form at the forward lateral margins of said heel seat portion of the sole, fillets 32 (Figs. 16 and 17), 32a (Fig. 16a) which terminate at, or preferably just within, the outer margins of the heel breast receiving shoulders 30, 30a and which, in the finished shoe, overlie the upper breast corners of the heel.

Considerable difficulty has been experienced in forming on soles 22 of different thicknesses and consistencies fillets 32, 32a which extend approximately to the outer margins of the heel breast receiving shoulders 30, 30a and which, in the finished shoes, do not show but serve, by reason of the action of the upper breast corners of the heels against them, to hold the rear lateral margins of the shank portions of the soles against the shoe uppers. Such difficulty has been largely due to the fact that in prior machines the stock to be cut to form the fillets 32, 32a has not been properly distorted and held during the shoulder- and fillet-forming cuts hereinafter described.

Figures 3, 14:
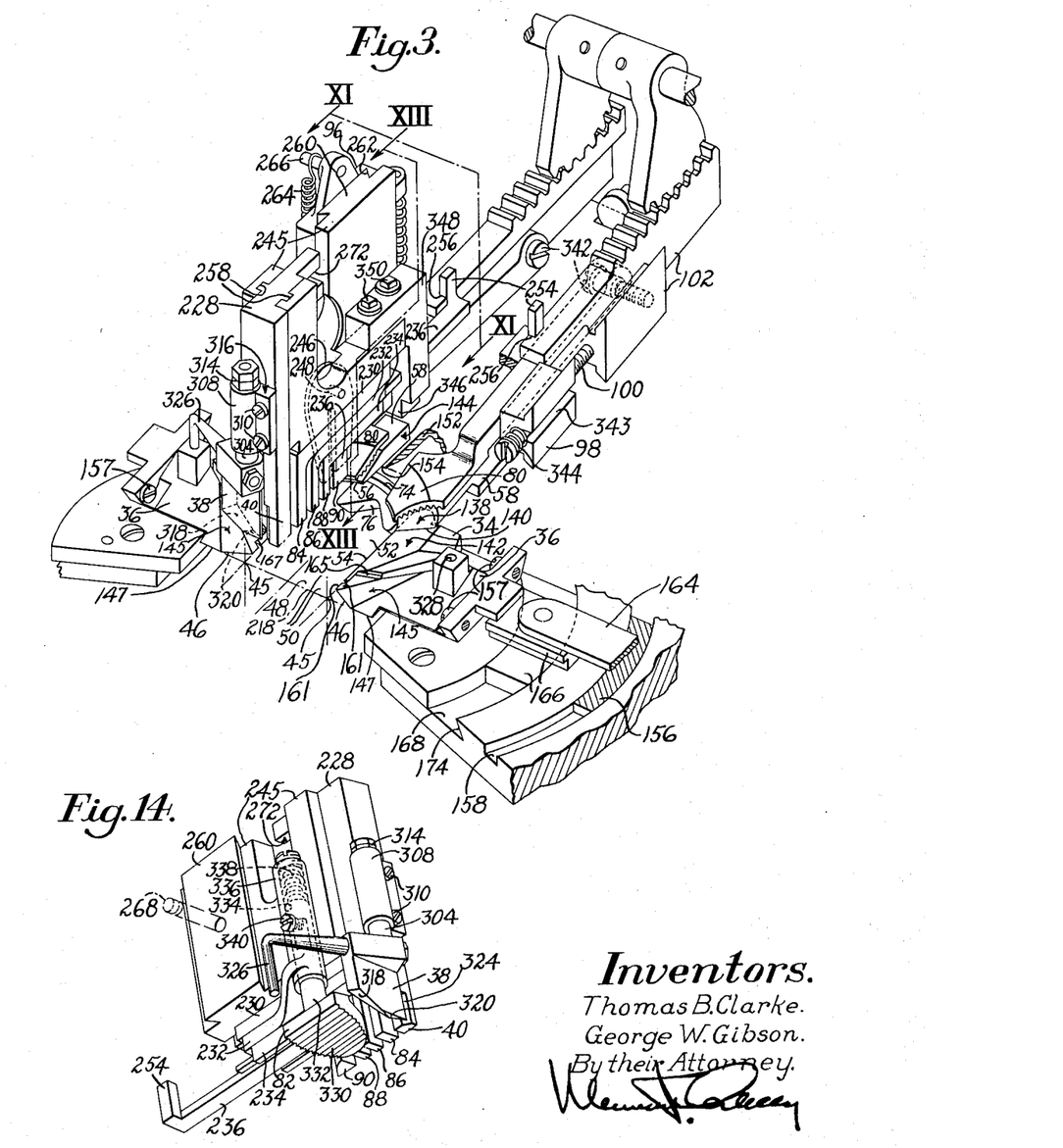
Fig. 3 is a perspective view showing crease plates, clamps and bulgers of the machine, together with portions of mechanism by means of which said plates, clamps and bulgers are moved into different relatively adjusted positions lengthwise of the machine in accordance with the length of a heel in a heel measuring gage.
Fig. 14 shows in perspective the left carrier slide and associated clamps and bulgers mounted upon the carrier slide.

With the foregoing considerations in view, applicants, in the machine disclosed in said Patent No. 2,215,524, hereinafter referred to as the parent machine, have substituted for the crease plates (42) disclosed in said patent, side and front crease plates 34, 36 and have also substituted for the clamps (52) and the bulgers (58) of such machine clamps or pressure members 38 and bulgers 40, and have substituted for the shoulder-forming knives (72) combined shoulder- and fillet-forming knives 42 movable along guides 44, associated front crease plates 36, clamps 38, guides 44 and knives 42 being adjustable together into different operative positions about axes 45 respectively, in order to produce the desired angles of the heel breast receiving shoulders 30, 30a with relation to a longitudinal median plane of the attached sole 22 of the shoe 24. As hereinafter disclosed, the front crease plates 36, which may also be referred to as crease fingers and enter the rand crease of the shoe, have opposed splayed edges 46 which form between them a splayed opening or entrance portion 48 (Figs. 3, 5 and 7) of an opening 50, a rear U-shape portion 52 of which is formed by opposing edges 54 of the side crease plates 34 and edges 56 of rear crease plates 58.

Figure 1:
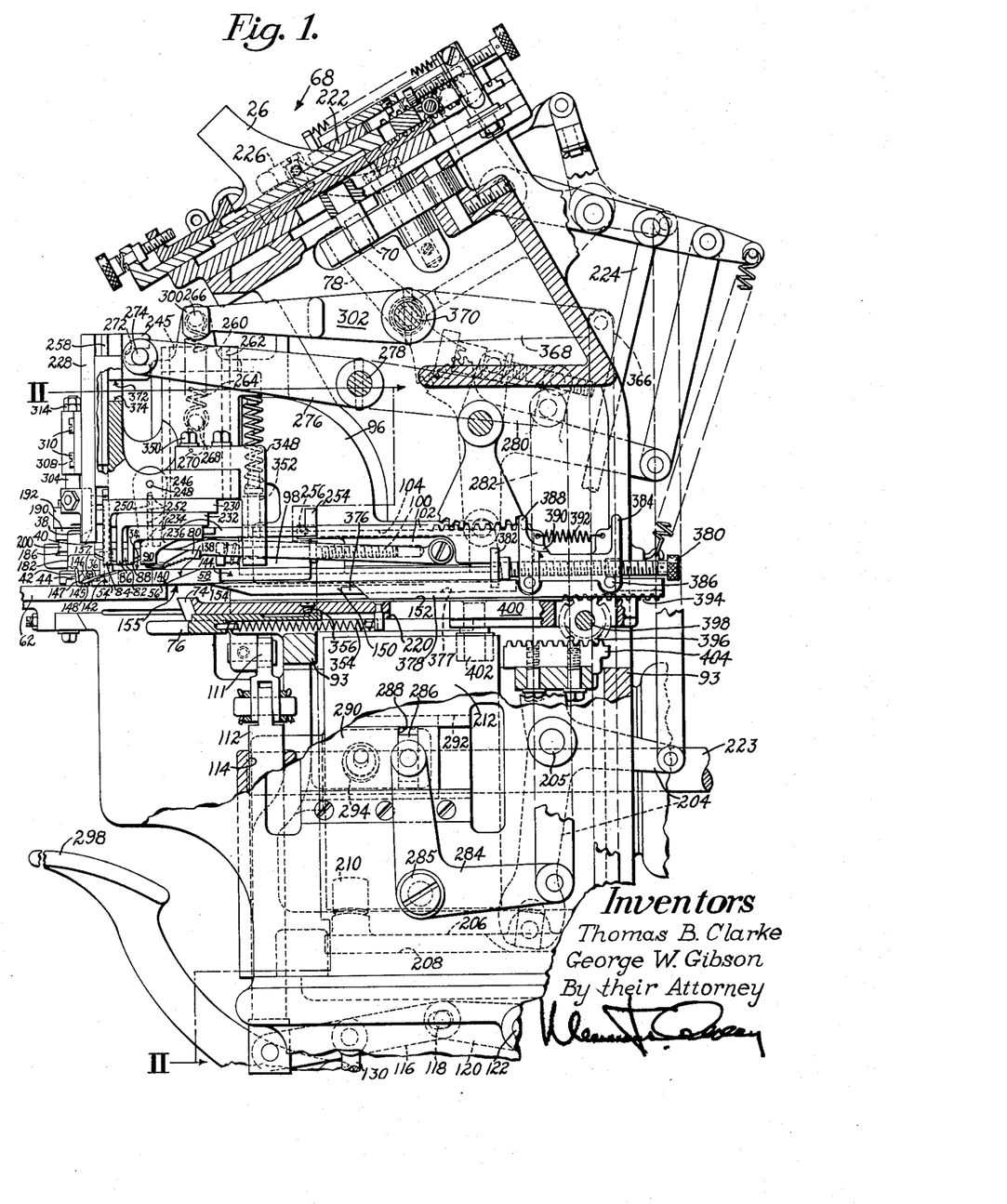
Fig. 1 shows the illustrative heel seat fitting machine, portions of which have been broken away, partly in side elevation and partly in section on line I—I of Fig. 2.
Figure 2:
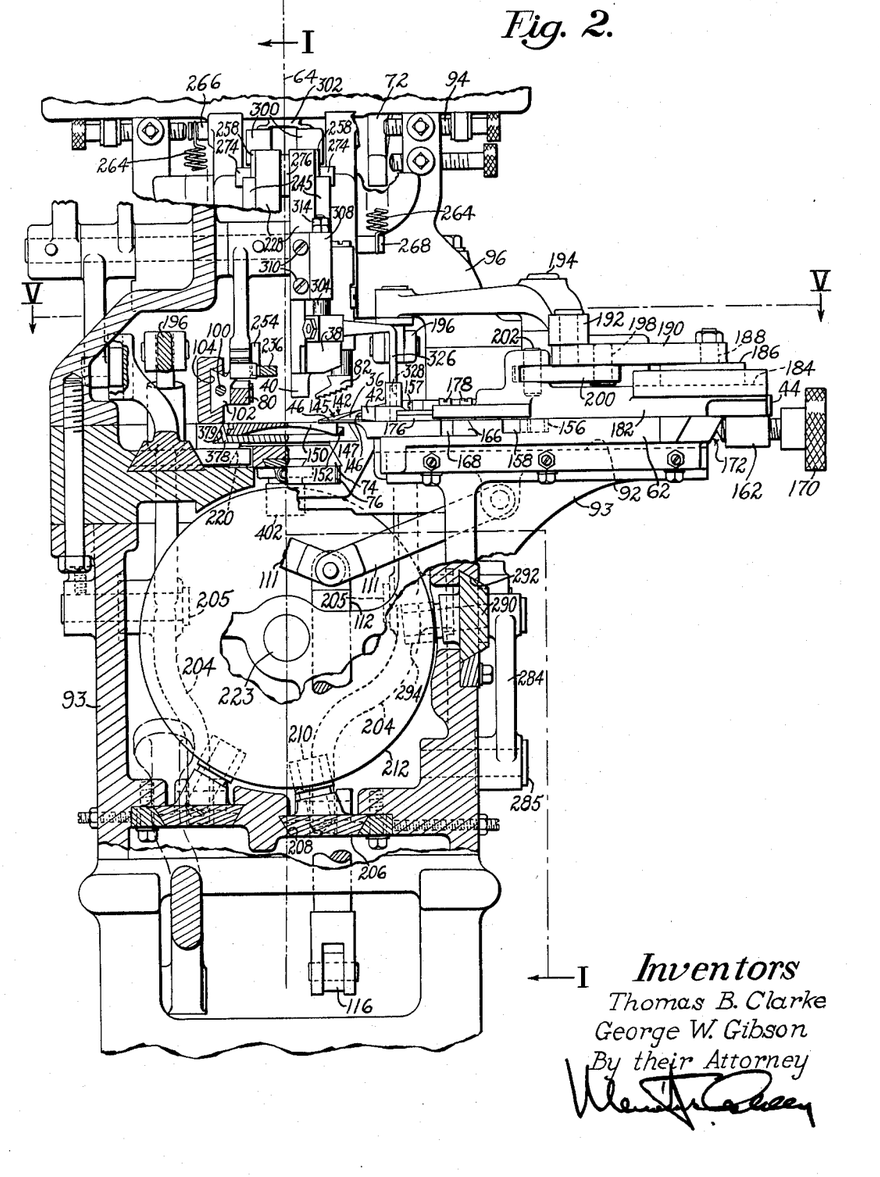
Fig. 2 shows the machine, portions of which have been broken away, partly in front elevation and partly in section on line II—II of Fig. 1.

The rear, side and front crease plates 58, 34, 36 respectively constitute a platen 60, right and left halves of which are supported by mechanism hereinafter described and comprising right and left sectors or carriers 62, said sectors being movable toward and away from active inner positions with relation to a central heightwise or vertical median plane 64, in accordance with the width of the heel 26 or 26a which is to be attached to the shoe and is initially clamped and measured lengthwise and widthwise in a gage 68 (Fig. 1). As explained in detail in said Patent No. 2,215,524, stops 70 (Fig. 1), 72 (Fig. 2) are set in accordance with the lengthwise and widthwise measurements of the heel 66 in the gage 68, the sectors 62 being movable inward toward the plane 64 until the stop 72 engages hereinafter described means connected to one of them to vary the width of the opening 50, and the rear crease plates 58, together with a back gage 74 (Figs. 1, 2, 3 and 5) and a centralizing gage 76 mounted thereon being moved lengthwise of said opening to vary the length of the opening until mechanism which comprises an arm 78 (Fig. 1), and is operatively connected to the back gage and to the crease plates, engages the stop 70.

The heel seat portion 20 of the attached sole 22 of the shoe 24 is forced against the side and rear crease plates 34, 58, respectively, by rear and side clamps 82, 80 preparatory to forcing through the opening 50 by depression of the right and left bulgers 40 and right and left bulgers 84, 86, 88 and 90, the central or median part of the heel seat portion of the sole. The rear, side and front clamps 80, 82 and 38, respectively, and the bulgers 40, 84, 86, 88 and 90 which are located at opposite sides of the central heightwise plane 64 and will hereinafter be referred to as right and left sets or pairs of clamps and bulgers, are supported by mechanisms comprising the sectors 62 and are movable transversely together with associated rear, side and front crease plates 58, 34 and 36, respectively, into different widthwise positions in paths determined by dovetail guideways 92 (Figs. 2, 4 and 6) in a main frame 93, in which guideways depending portions of the sectors 62 fit, in accordance with the position of the stop 72 which is engaged by a screw 94 (Fig. 2) threaded into the right of a pair of brackets 96 secured by mechanism hereinafter described to an associated sector 62.

The rear crease plates 58 are formed integral with slide blocks 98 (Figs. 1, 3, 5 and 11) adjustably secured by screws 100 to slides 102 which are movable forward and rearward along guideways 104 formed in the brackets 96, said brackets being adjustably secured through screw-and-slot connections 106 (Fig. 4) to lugs 108 which are adjustably secured initially to the sectors by mechanisms comprising screw-and-slot connections 110.

The present improvements are directed to only a portion of the parent machine illustrated in Patent No. 2,215,524 and accordingly only such portions of said machine as are necessary in understanding the present invention will be described herein.

The sectors 62 are pivoted to links 111 (Figs. 1, 2 and 6) inner ends of which are pivoted to a rod 112 mounted for vertical movement in a guideway 114 of the main frame 93. The lower end portion of the rod 112 is pivoted to the forward end of a lever 116 the rear portion of which is pivoted through a pin and-slot connection 118 to a forward end of a lever 120 pinned to one end of a shaft 122 journaled in the main frame 93. Pinned to the other end of the shaft 122 is a lever 124 carrying a pin 126 which is embraced by the upper end of a spring 128 having its lower end secured to the main frame 93.

Pivotally connected to the central part of the lever 116 is a rod 130 which is pivotally connected at its lower end to a treadle 132 (Fig. 6) mounted upon a fulcrum pin 133 journaled in the main frame 93. The treadle rod 130 is normally urged upward by a spring 134, the arrangement being such that during the first part of the counterclockwise movement of the treadle 132, as viewed in Fig. 6, the lever 116 is swung about the forward end of the lever 120, causing through mechanism above described the sectors 62 to be moved equal distances toward the central heightwise median plane 64 until limited by the stop 72 which, as above explained, is initially set in different adjusted positions widthwise of the machine in accordance with the width of the heel 26 or 26a in the heel gage 68. Movement of the sectors 62 away from each other along the dovetail guideways 92 is limited by engagement of the rear end of the treadle 132 with a screw 136 threaded into the main frame 93.

The rear crease plates 58 are formed integral with the side blocks 98 and overlap associated side crease plates 34 to varying extends depending upon the positions of the slide blocks in the guideways 104 of the brackets 96. Each of the rear crease plates 58 has an upper face 138 which is inclined to a plane of the adjacent inner edge 56 and a front edge 140 of which extends along an inclined face 142 of the adjacent crease plate 34. Opposing vertical faces 144 of the rear crease plates 58 are spaced slightly from each other when said crease plates are in their operating positions, the width of the gap between said faces varying in accordance with the widthwise setting of the right and left pairs of front, side and rear crease plates 36, 34 and 58. The edges 54, 56 of the side and rear crease plates 34, 58 form the U-shaped portion 52 of the opening 50 and are arranged approximately in a plane and may be described as lying in said plane.

The length of the opening 50 may be varied by adjusting the rear crease plates forward or rearward with relation to the side crease plates 34 and the front crease plates 36, the front edges 140 of the rear crease plates during such movement sliding over the inclined faces 142 of the corresponding side crease plates. The width of the opening 50 may be varied by moving the sectors 62 and with them the corresponding rear, side and front crease plates 58, 34 and 36 equal distances toward or away from the vertical median plane 64.

Before causing the bulgers 40, 84, 86, 88 and 90 to force the median part of the heel seat portion 20 of the sole 22 through the U-shaped portion 52 of the opening 50 and through the splayed portion 48 of said opening, opposite forward lateral areas or margins of the heel seat portion of the sole are clamped against faces 145 of the front crease plates 36 by the clamps 38, the opposite lateral side margins of the heel seat portion of the sole are clamped against the faces 142 of the side crease plates 34 by the clamps 82, and the rear margin of the heel seat portion of the sole is clamped against the faces 138 of the rear crease plates 58 by the rear clamps 80. The clamps 38, 82 and 80 are yieldingly forced against the sole in response to movement of mechanism which positively operates associated bulgers.

After the heel seat portion 20 of the sole 22 has been effectively clamped against the platen 60 by the clamps 38, 82 and 80 and has been forced, bulged, or depressed through the opening 50 and below flat bottom faces 151 (Fig. 8), 153 (Fig. 9), and 155 (Fig. 1) of the crease plates 36, 34 and 58, respectively, by the bulgers 40, 84, 86, 88 and 90 acting in combination with the clamps, the combined shoulder-and fillet-forming knives 42 are moved inward or toward the vertical median plane 64 on their guides 44, edges 146 of said knives which move along front edges 147 of the plates 36 forming on the sole the heel breast receiving shoulders 30, and edges 148 of the knives which move along the bottoms 151 of the plates 36 forming just rearward of said shoulders a short heel seat tab 149 (Fig. 17) which includes the fillets 32 and may be described as a front heel seat tab portion. The knife 42 may be described as a shoulder and tab forming knife and as having angularly disposed shoulder and tab forming cutting edges 146, 148 disposed at approximately right angles to each other, the shoulder forming cutting edge being arranged substantially vertically and the cutting edge 148, which forms the tab 149 which may be described as including the fillets 32 or 32a, being skewed with relation to its path of travel.

In order to assist the faces 142 of the side crease plates 34 in effectively supporting the margin of the heel seat portion 20 of the attached sole 22 of the shoe 24 the front crease plates 36 are provided with side faces 159 which are arranged generally parallel to the faces 142 of said side crease plates and terminate in edges 161 which may be defined as lying in the general plane of the edges 46, 54 of the front and side crease plates 36, 34 and as being approximately parallel or extending generally longitudinally of the machine. In order to insure against deflection of the inner ends of the front crease plates 36 during the heel seat forming operation the side crease plates 34 are provided with front platforms 165 upon which slide rabbeted lower faces 167 (Figs. 3 and 18) of the front crease plates.

In order to form the heel seat tab 28, which may be referred to as a conventional heel seat tab, there is provided a back knife 150 which slides forward along a guideway 152 (Figs. 1 and 2) of the machine frame 93 with its cutting edge 154 in engagement with the flat bottom faces 155, 153 and 151 of the crease plates 58, 34 and 36 of the platen 60 to trim from the sole 22 material which has been depressed through the opening 50, the cut made by the back knife intersecting the cuts made by the cutting edges 148 of the knives 42. In order to insure against interference between the knives 42, one of said knives may have a lead over the other. The back knife 150 may be described as forming upon the sole 22 a rear heel seat tab portion.

In fitting short outsoles (not shown) which extend only a fraction of an inch rearward of a heel breast line 163 (Fig. 15) of the sole 22 of the shoe 24, the short tab 149 together with a suitable filler or tuck serves as a seat for the heel. When this type of work is being operated upon the back knife 150, the side and rear clamps 82, 80 and the bulgers 84, 86, 88 and 90 are not in contact with the sole.

The mechanism for operating the shoulder- and fillet-forming knives 42 will now be described. Mounted upon each of the sectors 62 is the dovetail guide 44 which has a depending arcuate lip 156 (Figs. 2 and 3) fitting in an arcuate channel 158 formed in the upper face of the sector 62 and to which the front crease plates 36 are secured by screws 157. Fitting in a T-shaped groove 160 (Fig. 4) of each of the guides 44 is a T-shaped block 162 pivotally connected to a link 164 (Figs. 3, 4 and 5) the inner end of which is pivotally connected to a binding block 166 fitting in an arcuate channel 168 formed in the upper face of the sector 62. A screw 170 is threaded into each of the blocks 162, the inner end of the screw normally engaging in an undercut arcuate face 172 of the sector 62.

In view of the foregoing, it will be apparent that the dovetail guides 44 may be adjusted upon the sector 62 about corresponding axes 45 in accordance with the desired angular paths of movement of the shoulder- and fillet-forming knives 42 toward and away from the vertical median plane 64. The guides 44 may be secured in different angular positions upon their respective sectors 62 by forcing the inner ends of the screws 170 against the arcuate faces 172 of said sectors, thereby moving the blocks 162 outwardly and pulling the binding blocks 166 against undercut faces 174 respectively of the arcuate channels 168, the screws 170 and the binding blocks 166 together serving to secure the dovetail guides 44 against movement with relation to the sectors.

The axes 45 are disposed at right angles to the general plane of the edges 46, 54, 56 of the front, side and rear crease plates 36, 34 and 58 and may be described as passing through points which lie in said plane and are arranged approximately at points of intersection of forward and lateral projections of the rear and front ends respectively of the edges 46 of the front crease plates 36, as passing through points which are arranged substantially at the forward or entrance end of the splayed portion 48 of the opening 50 and are spaced inward slightly from the front crease plates 36 or as being spaced inward and forwardly from the front and rear ends respectively of the edges 46 of the front crease plates. The axes 45 may also be defined as being disposed at right angles to the general plane of the edges 46, 54 and 56 of the front, side and rear crease plates 36, 34, 58 and as passing approximately through points in said plane in the vicinity of points of intersection of forward projections of the sides of the U-shaped opening 50 or the paths of movement of the shoulder-forming cutting edges of the knives 42. The axes may be further defined as being disposed at right angles to the general plane of the edges 46, 54, 56, and arranged approximately in a line defined by forward ends of the edges 46 of the front crease plates at points spaced inward slightly from the front crease plates or as being arranged in the vicinity of points of intersection in said plane of the paths of movement of the cutting edges of the shoulder-forming knives and forward projections from the rear ends of the edges 46 of the front crease plates 36. The axes 45 may also be described as being disposed generally heightwise of the shoe being operated upon in the machine and as arranged in the paths of movement of the cutting edges of the knives at points spaced short distances inward from the opposite sides of the sole of the shoe.

Each of the shoulder- and fillet-forming knives 42 has a rectangular shank 176 which is secured by screws 178 in different adjusted positions in a channel 180 (Figs. 4 and 5) formed in a knife carrier slide 182 mounted for reciprocation along the guide 44. Formed in each of the knife carrier slides 182 is a dovetail guideway 184 in which freely slides a block 186 carrying a fulcrum pin 188 to which is connected the outer end of a link 190. The inner end of the link 190 is pivoted to a forward arm of a bell-crank lever 192 which is pivoted on an upstanding pin 194 secured to an associated lug 108 which, as above described, may be initially secured in different adjusted positions to and may be considered part of an associated sector 62. Rear arms of the bell-crank levers 192 are universally connected to the forward ends of links 196. Secured to each of the links 190 at opposite sides of the machine is a depending stud 198 to which is pivotally connected an outer end portion of a short link 200, the inner portion of said short link being pivotally connected to a fulcrum pin 202 threaded into the associated carrier slide 182. The links 196 are universally connected to the upper ends of compound levers 204 (Figs. 1 and 2) fulcrumed upon pins 205 supported by the main frame 93. Lower arms of the levers 204 are operatively connected to slides 206 which are mounted for movement along guideways 208 of the main frame, said slides carrying cam rolls 210 fitting in a common groove (not shown) of a barrel cam 212.

Figures 5, 18:
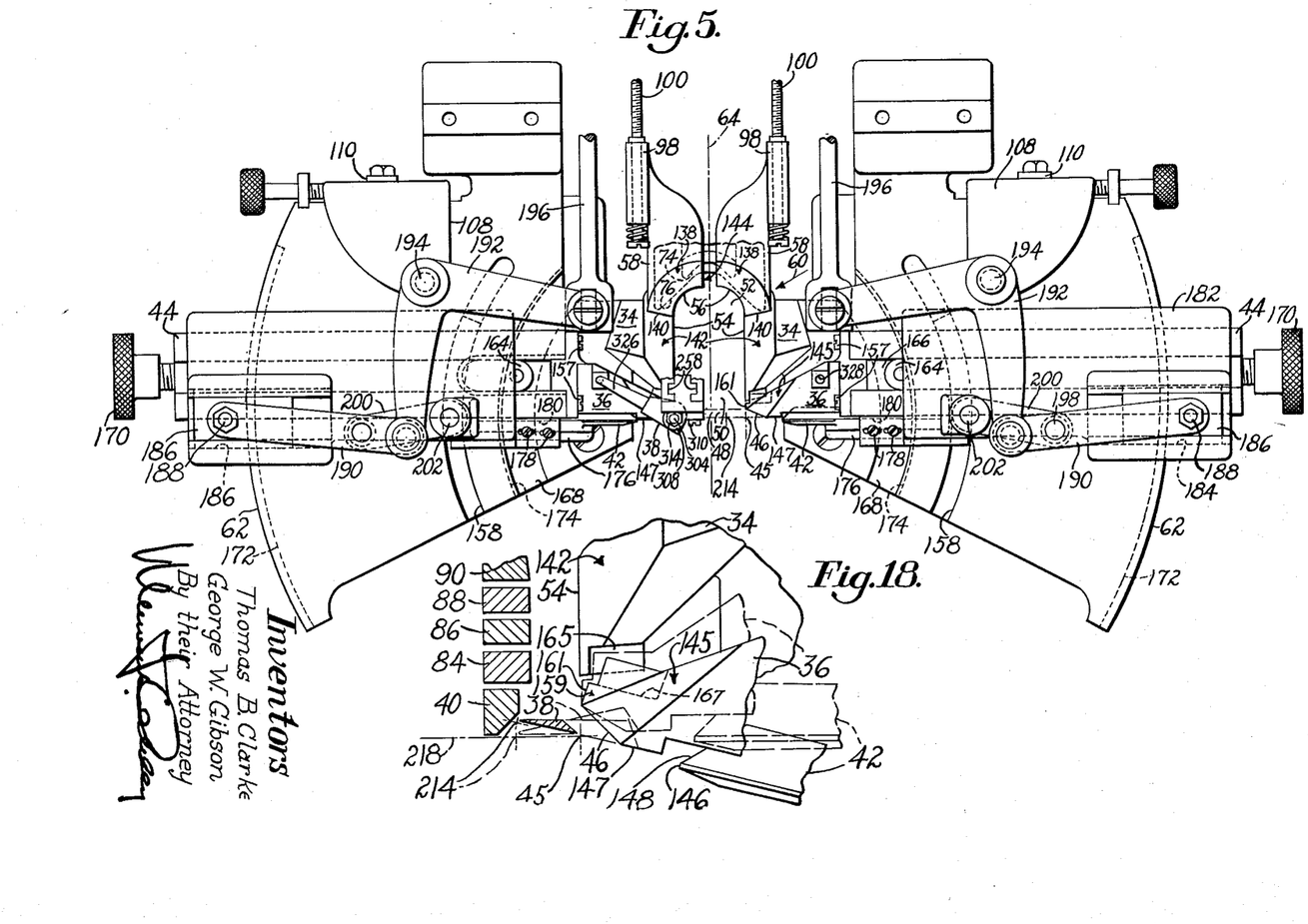
Fig. 5 is a plan view of a portion of the machine on line V—V of Fig. 2.
Fig. 18 is an enlarged view showing in full and dash lines the right crease plate and the right shoulder- and fillet-forming knife illustrated in Fig. 7 in the positions occupied when operating upon Louis and Cuban work.

During the operation of the machine the links 196 are moved rearward from the positions shown in Fig. 5 and are then returned to their initial positions, the shoulder- and fillet-forming knives 42 moving one with a slight lead over the other toward the vertical median plane 64 until the shoulder forming cutting edges 146 of said knives are moved inward substantially to corresponding vertical axes 214 and then back to their starting positions, the construction and arrangement of the mechanism for guiding and operating the knives being such that the lengths of the cutting strokes of the knives are substantially constant irrespective of the widthwise positions of the sectors 62 or the angles at which the dovetail guides 44 are adjusted upon the sectors.

Since the operative positions of the sectors 62 along the dovetail guides 92 may be varied in accordance with the width of the measured heel 26 in the gage 68 and each sector carries one of the front, side and rear crease plates 36, 34 and 58, respectively, the width of the opening 50 also is varied in accordance with the width of the heel, the associated right and left pairs of clamps or clamping members 38, 82, 80 and the bulgers 40, 84, 86, 88 and 90, through mechanism hereinafter described, moving laterally together with the sectors and being maintained in the same widthwise positions with relation to the crease plates irrespective of the widthwise positions of said sectors. Since the shoulder- and fillet-forming knives 42 and mechanism for operating the same are carried by the sectors 62, the arrangement is such that irrespective of the widthwise operative positions of the sectors the shoulder- and fillet-forming knives always move inward until their cutting edges 146 are in the vicinity of axes 214. During different lateral adjustments of the sectors 62 or different angular adjustments of the front crease plates 36 on said sectors the axes 45 remain in a fixed lateral plane 218 (Figs. 3 and 4), said axes being positioned approximately constant distances inward from the ends of the heel breast lines 163 of the heel seat portions 20 of attached outsoles 22 of shoes 24 of different widths positioned in the machine.

In order to position the shoe 24 lengthwise in the machine the countergage 74 is initially positioned along a guideway 220 (Figs. 1 and 2) of the main frame in accordance with the position of an abutment 222 (Fig. 1) of the heel measuring gage 68. Moreover, as above stated, in order to vary the length of the heel seat tab 28 in accordance with the length of the heel 26 in the heel measuring gage 68, the length of the opening 50 is varied by sliding the rear crease plates 58 over associated side crease plates 34, the operative positions of the clamps 82, 80, and the bulgers 84, 86, 88 and 90 also being varied lengthwise of the opening in accordance with variations in the operative positions of said abutment 222 of the heel measuring gage 68. Since the heel measuring gage 68 and its associated mechanism which sets the abutments 72, 70 in accordance with the widthwise and lengthwise dimensions of the heel 26 in the gage 68 are disclosed in detail in said Patent No. 2,215,524, a detailed description of this portion of the machine is not believed to be necessary.

In order that the operator before tripping a one-revolution clutch (not shown) to actuate the barrel cam 212 may readily ascertain that the work is properly positioned in the machine it is desirable that the heel seat portion 20 of the attached sole 22 of the shoe 24 shall be initially clamped manually in the machine. Accordingly, before said one-revolution clutch is tripped to power a cam shaft 223 (Figs. 1 and 2) to which the barrel cam 212 is secured, the treadle 132 is depressed first to move the sectors 62 to their proper widthwise positions determined by the stop 72 and thereafter to cause the side and rear clamps 82, 80 to force the margin of the heel seat portion of the outsole against the side and rear crease plates 34, 58, respectively. Before operating the treadle 132, another treadle (not shown), operatively connected to a heel gage operating rod 224 (Fig. 1), is depressed to move away from each other abutments 226 which measure the heel 26 widthwise in the gage 68, and to move the abutment 222 rearward, said abutments closing in on the heel by spring action as soon as the treadle rod 224 is released. The positions of the abutments 226 and the abutment 222 determine the positions of the above-described stops 72, 70, respectively, and accordingly the widthwise positions of the sectors 62 and the lengthwise position of the back gage 74.

Each of the front bulgers 40 is formed by the lower part of a slide 228 and the bulgers 84, 86, 88, 90 are formed by the lower portions of depending slides 230, 232, 234 and 236 respectively. The slides 236, 234 and 232 are mounted for forward and rearward movement along T-shaped guideways 238, 240 and 242 (Figs. 12 and 13) respectively of adjacent slides, the slide 230 being mounted for forward and rearward movement in a T-shaped guideway 244 of a carrier slide 245. As will appear later, each of the slides 228 is mounted for vertical movement with relation to and is also movable together with an associated sector 62 widthwise of the machine but is not movable forward or rearward of the machine. The slides 230, 232, 234, 236 are interconnected for proportionate adjustment lengthwise of the opening 50 by a lever 246 (Figs. 3 and 12) pivoted upon a fulcrum pin 248 journaled in the carrier 245, the lever having a slot 250 in which are received pins 252, the arrangement being such that when the right and left bulgers 84 are in their forwardmost adjusted positions in approximate contact with associated front bulgers 40, the bulgers 86, 88, 90 at opposite sides of the machine, are substantially in contact with the next forward bulger so that flat horizontally disposed sole engaging surfaces of the right and left bulgers form substantially continuous flat surfaces which extend lengthwise of the opening and are offset inward from the margin of said opening.

The slides 236 are provided with rearward extensions having vertical flanges 254 (Figs. 1, 3, and 14) slidingly fitting in vertical channels 256 of the slides 102 which move along the guideways 104 of the brackets 96 and are adjustably secured to associated blocks 98. It will thus be noted that the slides 236 are movable vertically with respect to the slides 102 but partake of the forward and rearward movement of the slides 102 in order initially to locate the bulgers 84, 86, 88 and 90 in different lengthwise operating positions in accordance with the lengthwise positions of the rear crease plates 58. When each of the slides 236 is moved rearward one-quarter of an inch, for example, by the slide 102 the presser members 84, 86, 88 and 90 are moved rearward one thirty-second of an inch, one-sixteenth of an inch, one-eighth of an inch and one-quarter of an inch respectively, the effective length of the bulgers as an entirety being increased by approximately one-quarter of an inch.

The vertical slides 228 are movable along guideways 258 (Figs. 3 and 4) of associated carrier slides 245 which have dovetail ribs 260 fitting in dovetail guideways 262 of the brackets 96. Each of the carrier slides 245 is normally held in its raised inactive position by a spring 264 the upper end of which embraces a pin 266 secured to the associated bracket 96 and the lower end of which is secured to a pin 268 which is threaded into the carrier slide and passes through an elongated vertical slot 270 (Figs. 1 and 4) formed in the bracket. Each of the vertical slides 228 has a slot 272 in which registers a pin 274 secured to and extending laterally from a power-operated lever 276 pinned to a shaft 278 (Fig. 1) which is rotatably supported by the machine frame 93 and has secured to it an arm 280 connected by a link 282 to a bell crank lever 284 pivoted upon a shaft 285 rotatably mounted in the main frame. The upper arm of the bell crank lever 284 carries a block 286 fitting in a vertical groove 288 of a slide 290 movable forward and rearward along a guideway 292 of the main frame. Carried by the slide 290 is a cam roll 294 fitting in a groove (not shown) of the barrel cam 212 secured to the drive shaft 223 actuated by the one-revolution clutch (not shown) which is tripped by depressing a hand lever 298 (Fig. 1).

When the machine is at rest the vertical slides 228 are held in their raised inactive positions by the power-operated lever 276, upward movement upon the brackets 96 of the carrier slides 245 acted on by the springs 264 being limited by any suitable means such, for example, as the engagement of the pins 268 which are threaded into the carrier slides, with the upper ends of the slots 270. When the carrier slides 245 are in their raised inactive positions their upper ends are arranged adjacent to lateral projections 300 of a treadle operated lever 302 through which said slides are depressed as will be explained presently.

As above stated, before the median part of the heel seat portion 20 of the attached sole 22 of the shoe 24 positioned upon the platen 60 is forced under power through the opening 50, the margin of said heel seat portion is forced with considerable pressure against faces 145, 142 and 138 of the front, side and rear crease plates 36, 34, and 58 by the front, side and rear clamps 38, 82, 80, respectively. Each of the front clamps 38 has a cylindrical stem 304 fitting in a cylindrical bore 306 of a boss 308 secured by screws 310 to a corresponding vertical slide 228 which is formed integral with, and may be referred to as the bulger, said clamps being constantly urged downward by a spring 312. Downward movement of each of the clamps 38 acted upon by the spring 312 is limited by the engagement of a nut 314 threaded onto a stem of said clamp with a face 316 of the slide 228.

Figures 6, 7, 8, 10:
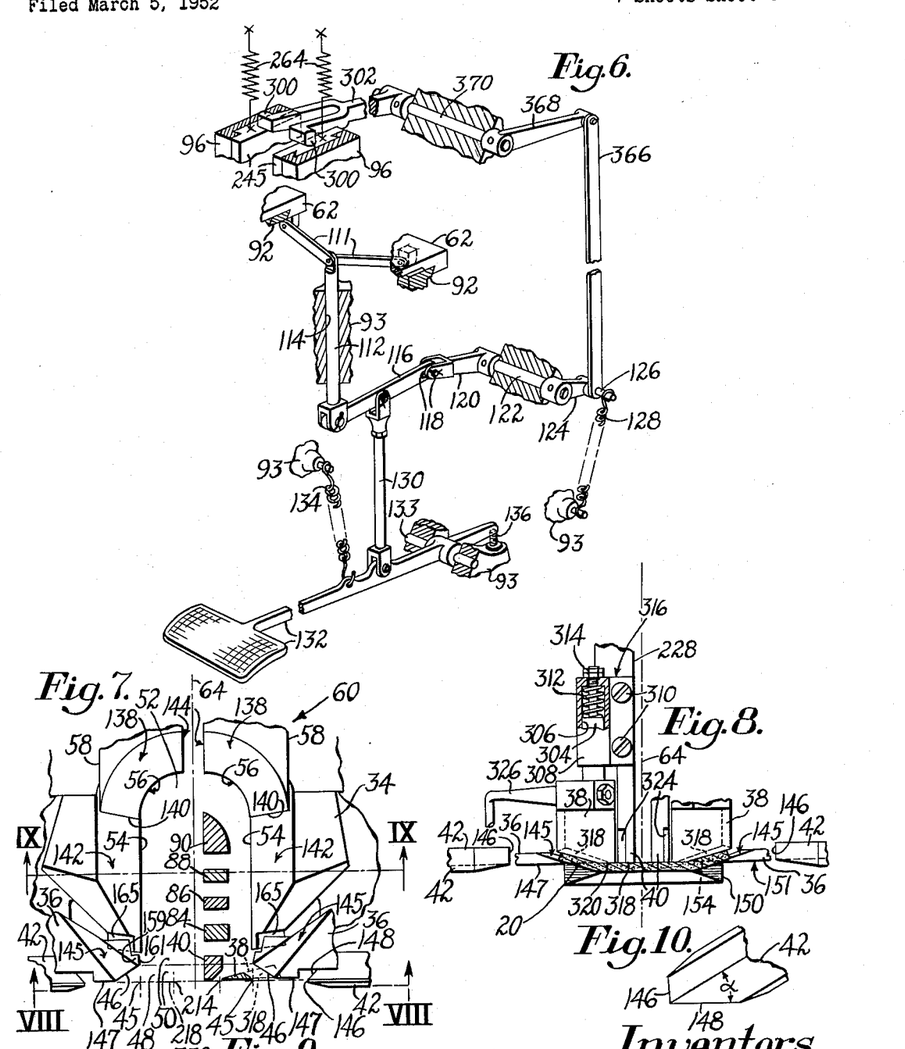
Fig. 6 is a skeleton view of mechanism for operating the sectors and for operating carrier slides which are mounted on the sectors and which support the clamps and the bulgers.
Fig. 7 is a plan view showing crease plates, bulgers and shoulder—and fillet—forming knives of the illustrative machine when the machine is idle.
Fig. 8 is a section on line VIII—VIII of Fig. 7 showing portions of front crease plates, front clamps, and front bulgers in the process of clamping and distorting the heel seat portion of the sole, and also showing right and left shoulder—and fillet—forming knives in their rest positions ready to be moved inward from opposite sides of the sole.
Fig. 10 is a perspective view showing the tip portion of the left shoulder- and fillet-forming knife.
Figure 9:
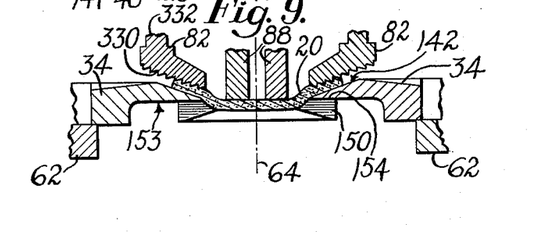
Fig. 9 is a section on line IX—IX of Fig. 7 showing side crease plates, side clamps and two of the bulgers of the machine in the process of clamping and distorting the sole.

The clamps 38 comprise bottoms, or sole engaging faces 318, which are parallel to corresponding inclined faces 145 of the front crease plates 36 and which overlie portions of said inclined faces 145, said clamps 38 also comprising horizontal faces 320 which extend inward from the faces 318 approximately to the associated bulgers 40. The faces 318 of the clamps 38, as viewed in Fig. 7, also extend substantial distances inward over the splayed edges 46 of the front crease plates 36, and front edges of said faces 318 are arranged in close proximity to the paths of movement of the cutting edges 146 of associated shoulder- and fillet-forming knives 42 and are in approximate alinement, as best shown in Fig. 7, with the front edges 147 of the front crease plates 36. As the shoulder- and fillet-forming knives 42 move inward toward each other, the cutting edges 146 of the knives travel along the front edges 147 of the associated front crease plates 46 and along the front edges of the faces 318 of the front clamps 38, the cutting edges 148 of the knives moving along the bottom faces 151 of the front crease plates 36 and just under the horizontal faces 320 of the clamps.

Inward movement of each of the knives 42 ceases when its cutting edge 146 arrives approximately at an associated axis 214, at which time the cutting edge 148 of the knife is in close proximity to the bottom face of an associated bulger 40 and extends along a slabbed-off face 324 of said bulger, said cutting edges 148 being disposed at an acute angle alpha to their paths of travel. By skewing the cutting edges 148 with relation to their paths of travel, the sole material is trimmed with a minimum amount of effort, thus insuring that sole material being trimmed is not displaced even though the cutting edges of the knives become somewhat dull. The bottoms of the bulgers 40 in their operating positions (Fig. 8) are commonly arranged just above the paths of movement of the cutting edges 148 of the knives 42 which usually stop just before said edges arrive at the faces 324 of the bulger. If desirable, however, the cutting edges 148 of the knives 42 may be moved under the bulgers, since said bulgers are commonly set just above the general plane of the bottoms 151 of the front crease plates 36. During the inward strokes of the knives 42 the cutting edges 148 pass through the thickness of the sole to form the short heel seat tab 149 and the fillets 32.

The clamps 38 have threaded into them rods 326 turned down cylindrical portions of which fit slidingly in vertical recesses 328 formed in associated front crease plates 36, the construction and arrangement being such that when the knife guides 44, which are secured to the front crease plates, are adjusted about associated axes 45, the front clamps are also swung the same number of degrees about said axes, together with associated guides and front crease plates. With such a construction and arrangement, the relation of the front crease plates 36, front clamps 38 and the paths of movement of the shoulder- and fillet-forming knives 40 is the same, irrespective of whether the attached soles of shoes are being fitted for the reception of Louis heels (Fig. 16), or for the reception of Cuban heels (Fig. 16a) the breasts of which have different transverse curvatures.

The side clamps 82 are carried by associated right and left slides 232 (Fig. 14), serrated sole-engaging faces 330 of each of the clamps being inclined to the vertical median plane 64 at the same angle as is the face 142 of the associated crease plate 34 over which said slamp is positioned. Each of the side clamps 82 has a cylindrical stem 332 fitting in a bore 334 of a cylindrical extension 336 of the slide 232 and located in said bore is a spring 338 which constantly urges an associated clamp 82 downward until a shoulder of the stem 332 engages a stop screw 340 threaded into the extension 336, the arrangement being such that when the machine is at rest the inner lower portions of the clamps 82 project somewhat below the sole-engaging faces of associated bulgers 84, 86 and 88.

The rear clamps 80 are mounted upon fulcrum pins 342 (Fig. 14) threaded into the slides 102, which, as above stated, fit in dovetail guideways 104 behind associated slide blocks 98 which carry the rear crease plates 58. The slide 102 and the slide block 98 at each side of the machine are secured together by one of the screws 100 which fits in a channel 343 (Figs. 3 and 14) in the outer side of the slide block and has shoulders in engagement with the front and rear ends respectively of the block, the rear end portion of the screw being threaded into the associated slide 102. The screw 100 is held in its adjusted position by a spring 344 (Fig. 3) interposed between the head of the screw and the slide block 98. It will thus be clear that the forward and rearward position of the rear clamps 80 may be initially varied with respect to their rear crease plates 38 by turning the screws 100.

When the machine is idle each of the rear clamps 80 is forced against a lug 346 (Figs. 3 and 11) of a bracket 348, which is secured by screws 350 to an associated carrier slide 245, by a spring-pressed plunger 352 slidable in a bore of the bracket, the arrangement being such that the forward ends of serrated sole engaging faces of the rear clamps 80 are normally arranged slightly below the sole engaging faces of associated rear bulgers 90.

The centralizing gage 76 is slidable forward and rearward along the counter or back gage 74 and is normally held in advance of the countergage by a spring 354 (Fig. 1), forward movement of the centralizing gage with relation to the countergage being limited by the engagement of a shoulder of the centralizing gage with a screw 356 carried by the back gage. The counter or back gage 74 is operatively connected by mechanism described in detail in said Patent No. 2,215,524 to the abutment 222 which measures the heel 26 in the measuring gage 68 lengthwise, the centralizing gage 76 being moved forward and rearward together with the back gage into different forward and rearward adjusted positions to the same extent that the blocks 98 are moved along their respective guideways 104.

The back knife 150 has transversely extending lugs 376 (Fig. 1) fitting in channels 377 formed in lateral flanges of a knife carrier 378 which may be regarded as part of the knife and is mounted for movement along a forward and rearward extending guideway 379 (Fig. 2) of the main frame 93. The back knife 150 may be secured in different adjusted positions to the knife carrier 378 by a screw 380 which has a collar 382 fitting in a recess of the knife and which is threaded into a block 384 mounted upon a pin 386 secured to the knife carrier. The block 384 is held in its operative position shown in Fig. 1 by a latch 388 which is pivoted at its lower end to the knife carrier 378 and has a lip 390 normally held in overlapping relation with said block by a spring 392. When it is desired to remove the back knife 150 from the knife carrier 378 the latch 388 is swung forward against the action of the spring 392 and the block 384 is swung clockwise about the fulcrum pin 386 causing the collar 382 of the screw 380 to be withdrawn from the recess of the knife. By the use of the above-described mechanism the back knife 150 may be readily removed from the machine for the purpose of sharpening said knife or for substituting therefor a knife of a different shape.

The bottom of the knife carrier 378 has a rack 394 meshing with a pinion 396 rotatably mounted upon a pin 398 secured to a slide 400 carrying a cam roll 402 which fits in a cam groove (not shown) of the barrel cam 212. The pinion 396 meshes with a rack 404 fixed to the main frame 93, the arrangement being such that the pinion 396 is driven to and fro through a fixed stroke when the barrel cam 212 is rotated, the back knife being driven through twice the stroke of the pinion. As above explained, the stroke and initial setting of the back knife 150 in the knife carrier 378 is such that the knife moves forward until its cutting edge 154 advances beyond the rear ends of the cuts made by the edges 148 of the shoulder- and fillet-forming knife 42, said knife then moving back to its retracted position shown in Fig. 1.

After forcing the shoe 24 against the centralizing gage 76 and then against the back gage 74 to position the heel seat portion 20 of the attached sole 22 of the shoe 24 upon the platen 60 with its heel breast line 163 (Fig. 15) in alinement with the fixed vertical plane 218, the operator depresses the treadle 132 causing the sectors 62 to move inward until the screw 94 threaded into the bracket 96 secured to the right sector 62 engages the stop 72. When this has taken place the crease plates 36, 34 and 58, the clamps 38, 82, 80 and the bulgers 40, 84, 86, 88 and 90 which are mounted upon associated sectors 62 are located in the desired adjusted positions widthwise in the machine in accordance with the width of the heel 26 in the heel measuring gage 68. As the operator continues to depress the treadle 132 the lever 116 (Fig. 6) is rotated about its pivotal connection with the lower end of the sector operating rod 112 causing a link 366 (Figs. 1, 2 and 6), which is operatively connected to the lever 124 through the pin 126, to be raised. The upper end of the link 366 is pivotally connected to the rear end of a lever 368 which is pinned to one end of a shaft 370 to which is pinned the lever 302 the lateral projections 300 of which overlie the upper ends of the carrier slides 245. It will, therefore, be clear that after inward movement of the sectors 62 has been limited by the stop 72 further depression of the treadle 132 causes the lever 302 to force the carrier slides 245 downward thereby causing the right and left clamps 82, 80 to force the margin of the heel seat portion 20 of the attached sole 22 of the shoe 24 positioned in the machine against the crease plates 34, 58 and also causing the bulgers 84, 86, 88 and 90 to be moved downward into approximate engagement with the median part of the heel seat portion of the sole.

When the heel seat portion 20 of the attached sole 22 of the shoe 24 has been initially clamped as above described and the operator has assured himself that the work is properly positioned, the clutch actuating hand-operated lever 298 is depressed causing rotation of the barrel cam 212 and accordingly counterclockwise rotation of the lever 276 (as viewed in Fig. 1) thereby depressing the slide 228 and causing the front clamps 38 to force the forward lateral margins of the heel seat portion of the sole against the splayed and side faces 145, 159 of the front crease plates 36 and the front bulgers 40 downward into engagement with the sole. When the flat bottom or sole-engaging faces of the front bulgers 40 have been moved downward into approximate alinement with the bottom faces of the bulgers 84, 86, 88 and 90 a face 372 (Fig. 1) of the slide 228 is in engagement with a face 374 of the carrier slide 245, continued downward movement of the forward end of the lever 276 causing the clamps 38, 82, 80 to be forced yieldingly against the sole with additional pressure and causing all the bulgers moving together as a unit to force the median part of the heel seat portion 20 of the sole 22 through the opening 50 of the platen 60 and below the flat lower faces 151, 153, 155 of the front, side and rear crease plates 36, 34, 58, said bulgers coming to rest when their sole-engaging faces are arranged just above the bottom faces of the crease plates.

After the margin of the heel seat portion 20 of the attached sole 22 of the shoe 24 has been clamped against the crease plates 36, 34, 58 and the central part of said heel seat portion has been bulged through the opening 50 as above described, the shoulder- and fillet-forming knives 42 are moved inward along their guides 44 to form the heel breast receiving shoulders 30, 30a and the short heel seat tab 149 including the fillets 32, 32a upon the sole 22. Upon retraction of the shoulder- and fillet-forming knife 42 the back knife 150 is moved forward with its cutting edge 154 in approximate engagement with the bottom faces 151, 153 and 155 of the crease plates 36, 34 and 58 to reduce the heel seat portion of the sole forwardly to the short heel seat tab 149 formed by the knives 42 thereby forming the conventional heel seat tab 28.

As above explained when the heel seat portions of short outsoles attached to shoes are fitted by the use of the above machine the back knife 150 may be removed from the machine, the cutting edges 148 of the knives 42 which may be referred to as side knives removing material from opposite sides of the heel seat portion of the sole from the heel breast line 163 to the rear end of the sole.

Having thus described our invention, what we claim as new and desire to secure by Letters Patent of the United States is:

1. In a heel seat fitting machine, a platen comprising crease plates having edges which are arranged substantially in a plane and form a U-shaped opening, and a pair of front crease plates having edges arranged substantially in said plane and forming a splayed opening continuous with said U-shaped opening, said front crease plates being movable into different adjusted positions about axes respectively disposed at right angles to said plane and passing approximately through points of intersection of forward projections of the sides of said U-shaped opening with the front end of the splayed opening.

2. In a heel seat fitting machine, a platen comprising right and left pairs of crease plates having edges which are arranged substantially in a plane and forming U-shaped openings and right and left front crease plates having edges arranged substantially in said plane and forming a splayed opening continuous with said U-shaped opening, means for adjusting right crease plates and left crease plates as units widthwise of said openings to vary the width of said combined openings, and means for relatively adjusting the crease plates lengthwise of said openings to vary the length of said combined openings, said front crease plates being adjustable about axes respectively, disposed at right angles to said plane and passing approximately through points of intersection of forward projections of the sides of the U-shaped opening with the forward end of the splayed opening.

3. In a heel seat fitting machine, a platen which comprises a plurality of crease plates including front crease plates and has an opening comprising a splayed entrance portion and which is adapted to support the margin of the heel seat portion of a sole, and means for relatively adjusting said crease plates lengthwise and widthwise of said opening to vary the length and the width of said opening, said front crease plates having edges which are arranged in a plane and form an entrance portion of said opening, and having sole supporting faces terminating at said edges and inclined at a slight angle to said plane, said front crease plates being pivotally adjustable about axes respectively disposed at right angles to said plane and passing substantially through a line defined by forward ends of said edges at points spaced short distances inward from said front crease plates.

4. In a heel seat fitting machine, a platen comprising right and left pairs of crease plates which comprise opposed spaced front crease plates and which have edges arranged substantially in a plane and forming an opening an entrance portion of which is formed by said front crease plates, right and left pairs of clamps which comprise front clamps and are constructed and arranged to force the margin of the heel seat portion of an attached sole of a shoe against portions of the plates bordering said opening, right and left pairs of bulgers which are operatively connected to the right and left pairs of crease plates and clamps and are constructed and arranged to force the median part of the heel seat portion of the sole through said opening, means comprising interconnections between the front crease plates and the front clamps respectively for swinging into different adjusted positions said front crease plates together with said front clamps about axes respectively which are disposed at right angles to said plane and are positioned approximately at the forward end of said entrance portion of said opening at substantial distances inward from the front crease plates, and means for operating the clamps to cause them to force the margin of the heel seat portion of the sole against the crease plates and for thereafter operating the bulgers to cause them to force said median portion of the sole through the opening.

5. In a heel seat fitting machine, a platen comprising opposed right and left pairs of crease plates which comprise opposed spaced front crease plates and which have edges arranged substantially in a plane and forming an opening an entrance portion of which is formed by said front crease plates, right and left pairs of clamps which comprise front clamps and are constructed and arranged to force the margin of the heel seat portion of an attached sole of a shoe against portions of the plates bordering said opening, right and left pairs of bulgers which are operatively connected to the right and left pairs of crease plates and clamps and are constructed and arranged to force the median part of the heel seat portion of the sole through said opening, means moving said right crease plates, clamps and bulgers and said left crease plates, clamps and bulgers of said pairs toward and away from each other in accordance with the width of a heel to be attached to the shoe, means comprising interconnections between the front crease plates and the front clamps respectively for swinging into different adjusted positions said front crease plates with the clamps about axes respectively which are disposed at right angles to said plane and are positioned approximately at the forward end of the entrance portion of said opening at substantial distances inward from the front crease plates, and means for operating the clamps to cause them to force the margin of the heel seat portion of the sole against the crease plates and for thereafter operating the bulgers to cause them to force said median portion of the sole through the opening.

6. In a heel seat fitting machine, means for positioning a shoe, a pair of crease plates which have edges forming an opening and are movable from opposite sides of the shoe into a rand crease formed between an overlasted counter portion of the shoe and the heel seat portion of an attached sole of the shoe, means which comprises a pair of clamps for forcing respectively the forward lateral margins of the heel seat portion of the sole against said crease plates and which is constructed and arranged to force the forward central part of the heel seat portion of the sole through said opening, a pair of guides secured to the crease plates, and a pair of knives movable transversely of the shoe upon said guides to form upon the sole heel breast receiving shoulders and a short heel seat tab having fillets, means for operatively connecting crease plates and clamps respectively of said pairs, and means for moving into different active positions crease plates, guides and clamps respectively of said pairs about axes respectively which are disposed generally heightwise of the shoe and which lie in the paths of movement of the knives at points respectively, spaced short distances inward from opposite sides of the sole of the shoe.

7. In a heel seat fitting machine, carriers, crease plates which are adapted to enter the rand crease of a shoe just rearward of the heel breast line of an attached sole of the shoe and have forwardly splayed edges arranged in a plane and forming a splayed opening and which have faces terminating at said edges and inclined to said plane, guides which are mounted upon said carriers and which are secured to said crease plates respectively, clamps having faces which are parallel to said faces of the crease plates and are arranged in opposed relation to said faces and to the lateral margins of said splayed opening, bulgers which are operatively connected to the crease plates and the clamps, means for moving said clamps and said bulgers at right angles to said plane to force the margins of the heel seat portion of the sole of the shoe against said faces of the crease plates and to force the sole into the splayed opening, knives slidable on the guides and having cutting edges arranged respectively at right angles and parallel to said plane to form on the sole heel breast receiving shoulders and a heel seat tab having holddown fillets at its forward lateral margins, and means comprising interconnections between the clamps and the crease plates respectively for swinging to the same extent about axes disposed at right angles to said plane and passing through points in the vicinity of the intersection of the paths of movement of the shoulder forming edges of the knife and forward projections of the rear ends of the edges of the crease plates, said crease plates, clamps, guides and knives.

8. In a heel seat fitting machine, spaced crease plates which have opposing edges arranged in a plane and defining a forwardly splayed opening and which have work supporting faces inclined to said plane and terminating at said edges, clamps having faces which are substantially parallel to said inclined faces of the crease plates and outer portions of which overlie said faces of said plates and inner portions of which overlie said opening, bulgers upon which the clamps are yieldingly mounted for movement at right angles to said plane, means for moving the clamps and the bulgers at right angles to said plane to clamp forward lateral margins of the heel seat portion of a sole of a shoe against the inclined faces of the crease plates and to force the median part of the heel seat portion of the sole through said opening and firmly against and around the splayed edges of said plates, and means comprising interconnections between the clamps and the crease plates respectively for moving into different adjusted positions associated clamps and crease plates about axes arranged at right angles to said plane and passing approximately through points of intersection of forward and lateral projections in said plane of the rear and front ends of the edges respectively of said plates.

9. In a heel seat fitting machine, spaced crease plates which have opposing edges arranged in a plane and defining a forwardly splayed opening and which have work supporting faces inclined to said plane and terminating at said edges, clamps having faces which are arranged substantially parallel to said inclined faces of the crease plates and outer portions of which overlie said faces of the plates and inner portions of which overlie said opening, means for moving the clamps relatively to the crease plates at right angles to said plane to clamp forward lateral margins of the heel seat portion of a sole of a shoe against the inclined faces of the crease plates and to force the median part of the heel seat portion of the sole through said opening and firmly against and around the splayed edges of said plates, and means comprising interconnections between the clamps and the crease plates respectively for moving into different adjusted positions associated clamps and crease plates about axes respectively arranged at right angles to said plane and passing approximately through points of intersection of forward and lateral projections in said plane of the rear and front ends of said edges respectively of said plates.

10. In a heel seat fitting machine, spaced crease plates which have opposing edges arranged in a plane and defining a forwardly splayed opening and which have work supporting faces inclined to said plane and terminating at said edges, clamps having faces which are substantially parallel to said inclined faces of the crease plates and outer portions of which overlie said plates and inner portions of which overlie said opening, bulgers in which the clamps respectively are mounted for yielding movement at right angles to said plane, means for moving said clamps and bulgers at right angles to said plane to clamp the margin of a heel seat portion of a sole against the inclined faces of the crease plates and to force the median portion of the heel seat portion of the sole through said opening and around said edges of the crease plate, guides secured to the crease plates respectively, knives which have angularly disposed cutting edges and are movable toward each other on said guides respectively to form on the heel seat portion of the sole heel breast receiving shoulders and a heel seat tab having holddown fillets at its lateral margins, and means including interconnections between the crease plates and the clamps for moving groups respectively, each comprising one of the clamps, crease plates, guides and knives, into different adjusted positions about axes arranged at right angles to said plane and passing through points arranged respectively in the vicinity of points of intersection of forward projections in said plane of the rear ends of said splayed edges with paths of movement of the shoulder forming edges respectively of said knives.

11. In a heel seat fitting machine, a platen comprising side crease plates having opposing spaced substantially parallel edges which lie in a plane and define a rear opening of approximately uniform width and also define the lower ends of work supporting faces formed on the plates and inclined to said plane, and front crease plates which have opposing splayed edges extending outward as they extend forward and which are arranged in said plane and define a splayed entrance portion of said opening and also define the lower ends of work supporting faces formed on said front crease plates and inclined to said plane, said front crease plates being mounted for pivotal movement about axes disposed at right angles to said plane and extending substantially through points arranged substantially at the splayed end of said entrance portion of the opening and spaced inward substantial distances from the front crease plates.

12. In a heel seat fitting machine, right and left crease plates forming an opening, right and left pairs of clamps, bulgers and knives respectively, right and left guides which are secured to the right and left crease plates respectively, said knives having angularly disposed shoulder and tab forming cutting edges respectively and being movable on said guides in predetermined paths toward and away from a median plane of the crease plate opening, said clamps being yieldingly mounted upon the bulgers respectively, means for operating said bulgers and accordingly said clamps to force the forward lateral margins of the heel seat portion of an attached sole of a shoe against said crease plates and to force inner portions of said margins into said opening to deform the inner portions of said margins transversely and longitudinally and to cause said bulgers to cooperate with said clamps and said crease plates to force the median part of the heel seat portion of the sole through said opening, means for moving said knives upon said guides toward said median plane to form on the sole heel breast receiving shoulders and a heel seat tab which has holddown fillets arranged adjacent to said shoulders, and means including interconnections between the crease plates and the clamps for moving through equal arcs into different adjusted positions right and left groups respectively of crease plates, clamps and guides about axes which are disposed approximately at right angles to the general plane of the sole and pass through the paths of movement of the shoulder forming cutting edges of said knives at substantial distances inward from the lateral edges of the soles.

13. In a heel seat fitting machine, pairs of right and left crease plates which form an opening and which comprise a pair of right and left front crease plates and have surfaces bordering on said opening, said right and left front crease plates having front edges respectively arranged at forward lateral margins of said opening, pairs of right and left bulgers comprising a pair of right and left front bulgers, pairs of right and left clamps comprising a pair of right and left front clamps which are yieldingly mounted respectively on the pair of right and left front bulgers, a pair of right and left guides, a pair of right and left side knives movable respectively on said guides, interconnections between the crease plates, the clamps, the bulgers, the guides, and the side knives, said knives having angularly disposed shoulder and tab forming cutting edges respectively and being movable toward and away from a central heightwise median plane of the crease plate opening, means comprising portions of said interconnections for moving the bulgers and the clamps toward the crease plates to force the margin of the heel seat portion of an attached sole of a shoe against said plates and thereafter to force the median part of said heel seat portion through said opening and beyond said surfaces of the crease plates thereby deforming the clamped heel seat portion of the sole, a back knife movable lengthwise of the sole along said surfaces of the crease plates, means for moving said right and left side knives along said right and left guides toward said median plane with their shoulder forming cutting edges moving along the front edges of the front crease plates to form upon the sole heel breast receiving shoulders and with their tab forming cutting edges movable along said surfaces of the front crease plates to form a front heel seat tab portion which is arranged adjacent to said shoulders and has at its lateral margins holddown fillets, means for moving the back knife forward along said surfaces of the crease plates to form a rear heel seat tab portion which is substantially continuous with said front heel seat tab portion, means comprising portions of said interconnections for moving into different angularly adjusted positions right and left front crease plates, clamps, guides and side knives respectively about axes which are disposed approximately at right angles to the general plane of the sole and pass through paths of movement of the shoulder forming cutting edges of said knives at substantial distances inward from the lateral edges of the soles of the shoes being operated upon, a heel measuring gage, mechanism comprising a stop set in accordance with the length of a heel measured in said gage, means comprising portions of said interconnections for relatively adjusting the pairs of crease plates, clamps and bulgers lengthwise of said opening formed by said crease plates to vary the length of said opening and the effective lengths of the clamps and the bulgers in accordance with the setting of said stop, and treadle mechanism for operating said interconnections to move in timed relation, the crease plates, clamps, bulgers, side knives and back knife.

14. In a heel seat fitting machine, pairs of right and left crease plates which form an opening and which comprise a pair of right and left front crease plates and have surfaces bordering on said opening, said right and left front crease plates having front edges respectively arranged at forward lateral margins of said opening, pairs of right and left bulgers comprising a pair of right and left front bulgers, pairs of right and left clamps comprising a pair of right and left front clamps which are yieldingly mounted respectively on the pair of right and left front bulgers, a pair of right and left guides, a pair of right and left side knives movable respectively on said guides, interconnections between the crease plates, the clamps, the bulgers, the guides, and the side knives, said knives having angularly disposed shoulder and tab forming cutting edges respectively and being movable toward and away from a central heightwise median plane of the crease plate opening, means comprising portions of said interconnections for moving the bulgers and the clamps toward the crease plates to force the margin of the heel seat portion of an attached sole of a shoe against said plates and thereafter to force the median part of said heel seat portion through said opening and beyond said surfaces of the crease plates thereby deforming the clamped heel seat portion of the sole, a back knife movable lengthwise of the sole along said surfaces of the crease plates, means for moving said right and left side knives along said right and left guides toward said median plane with their shoulder forming edges moving along the front edges of the front crease plates to form upon the sole heel breast receiving shoulders and with their tab forming cutting edges movable along said surfaces of the front crease plates to form a front heel seat tab portion which is arranged adjacent to said shoulders and has at its lateral margins holddown fillets, means for moving the back knife forward along said surfaces of the crease plates to form a rear heel seat tab portion which is substantially continuous with said front heel seat tab portion, means comprising portions of said interconnections for moving into different angularly adjusted positions right and left front crease plates, clamps, guides and side knives respectively about axes which are disposed approximately at right angles to the general plane of the sole and pass through paths of movement of the shoulder forming cutting edges of said knives at substantial distances inward from the lateral edges of the soles of the shoes being operated upon, a heel measuring gage, mechanism comprising a stop set in accordance with the width of a heel measured in said gage, means comprising portions of said interconnections for moving right and left crease plates, clamps, bulgers, guides and side knives toward and away from one another in accordance with the setting of said stop, and treadle mechanism for operating said interconnections to move in timed relation, the crease plates, clamps, bulgers, side knives and back knife.

15. In a heel seat fitting machine, a pair of crease plates having opposed pairs of longitudinal and splayed edges respectively lying substantially in a plane and defining respectively a rear opening and a splayed front opening continuous with said rear opening, said crease plates having front edges respectively and having surfaces respectively arranged generally in said plane and bordering on said openings, said crease plates also having side and splayed faces which are inclined to said plane and terminate respectively at said side and splayed edges, clamps which are interconnected for movement with the crease plates and are movable relatively to said crease plates, means comprising said clamps for forcing the forward lateral margins of the heel seat portion of an attached sole of a shoe against said side and splayed faces of the crease plates and for forcing the median part of the heel seat portion of the sole through said openings and beyond said surfaces of the plates, knives having angularly disposed cutting edges movable inward from opposite sides of the sole along said front edges and said surfaces respectively of said crease plates for forming upon the sole heel breast receiving shoulders and a short heel seat tab including holddown fillets arranged adjacent to and rearward of said shoulders, and mechanism for operating in timed relation said crease plates, said means and said knives.

16. In a heel seat fitting machine, a pair of spaced crease plates having, respectively, opposed pairs of side edges and forwardly and outwardly splayed edges lying substantially in a plane and defining a rear opening and a front splayed opening continuous with said rear opening, said crease plates having front edges and bottom faces and having side and splayed faces inclined to said plane and terminating respectively at said side and splayed edges, mechanisms comprising clamps for forcing the forward lateral margins of the heel seat portion of an attached sole of a shoe against said side and splayed faces of the crease plates and beyond the bottom faces of said crease plates and for forcing the median part of the heel seat portion of the sole through said openings, and knives having cutting edges movable in paths extending along the front edges and bottom faces respectively of the crease plates respectively to form on the sole heel breast receiving shoulders and a short heel seat tab having holddown fillets adjacent to and rearward of said shoulders, a heel gage, means for moving associated crease plates and mechanisms toward and away from each other to vary the width of said opening and the effective operating width of said mechanisms in accordance with the width of a heel measured in said heel gage, and means comprising interconnections between the crease plates, clamps and knives respectively for moving said plates, clamps and knives into different adjusted positions about axes respectively which are disposed at right angles to said plane and which pass through points arranged in the vicinity of points of intersection of forward projections in said plane of rear ends of said splayed edges with paths of movement of the shoulder forming cutting edges of said knives.

17. In a heel seat fitting machine, right and left crease plates having, respectively, opposed pairs of side edges and forwardly and outwardly splayed edges lying substantially in a plane and defining respectively a rear opening and a front splayed opening continuous with said rear opening, said crease plates having front edges and bottom faces respectively and having side and splayed faces inclined to said plane and terminating respectively at said side and splayed edges, right and left mechanisms comprising right and left clamps respectively for forcing the forward lateral margins of the heel seat portion of an attached outsole of a shoe against said side and splayed faces of the crease plates and beyond the bottom faces of said plates and for forcing the median part of the heel seat portion of the sole through said opening, right and left guides, right and left knives movable along said guides respectively and having cutting edges movable in paths extending respectively along the forward edges and the bottom faces of the crease plates to form on the sole heel breast receiving shoulders and a short heel seat tab having holddown fillets, means for moving said right and left crease plates, mechanisms, guides and knives as units widthwise of the crease plates to vary the width of said opening and the effective width of said mechanisms and the starting positions of the knives, and means comprising interconnections between right and left crease plates, clamps, guides and knives respectively for moving said plates, clamps and knives into different adjusted positions about axes respectively which are disposed at right angles to said plane and pass through points arranged in the vicinity of points of intersection of forward projections in said plane of rear ends of said splayed edges with paths of movement of the shoulder forming cutting edges of said knives.

References Cited in the file of this patent

UNITED STATES PATENTS 1,850,149  Hazelton — Mar. 22, 1932

FOREIGN PATENTS 319,935  Great Britain — Oct. 3, 1929